Patented Feb. 20, 1923.

1,446,375

UNITED STATES PATENT OFFICE.

WALTER O. BORCHERDT, OF AUSTINVILLE, VIRGINIA, ASSIGNOR TO THE NEW JERSEY ZINC COMPANY, OF NEW YORK, N. Y., A CORPORATION OF NEW JERSEY.

CONCENTRATION OF OXIDIZED ORES.

No Drawing. Application filed May 27, 1919, Serial No. 300,201. Renewed November 29, 1922.

*To all whom it may concern:*

Be it known that I, WALTER O. BORCHERDT, residing at Austinville, in the county of Wythe, State of Virginia, have invented certain new and useful Improvements in the Concentration of Oxidized Ores; and I do hereby declare the following to be a full, clear, and exact description of the invention, such as will enable others skilled in the art to which it appertains to make and use the same.

This invention relates to improvements in the sulfidization and flotation of oxidized ores, that is, of ores such as oxide, carbonate, silicate and other non-sulfid ores, which require preliminary sulfidizing prior to concentration by flotation. More particularly, the invention relates to a process of treating ores which contain flotation inhibitory colloidal constituents in objectionable amount, which constituents are commonly present in ore pulps. Such colloidal constituents are objectionable when present in too large amount and seriously interfere with the sulfidization and the flotation of the ores, requiring larger quantities of sulfidizing agents, greater dilution of the ore pulp, larger quantities of flotation agents, excessive agitation and giving an over-stabilized froth and dirty concentrate, with inferior recovery of the valuable minerals.

The colloidal constituents of ore pulps are rarely, if ever, naturally deflocculated and dispersed to their maximum possible extent. Since aggregated or flocculated colloid masses act like solid particles of greater magnitude the removal of the partially flocculated colloidal constituents of an ore pulp by means of settling processes, or even washing with water on tables or vanners, is generally incomplete and inadequate. The agencies which promote the flocculation of the colloidal constituents of an ore pulp also in general seem to promote the adsorption or other form of attachment which exists between such colloidal constituents and the granular constituents of the ore pulp. It follows, therefore, that when the colloidal constituents of an ore pulp have been thoroughly deflocculated and minutely dispersed that they no longer exist in the form of aggregates resembling the coarser solid particles of the pulp, but behave more like substances in solution, and are, in fact, spoken of as being in colloidal solution, in which condition the forces tending to maintain them in suspension are greater than the effect of gravity, thereby greatly facilitating their separation by sedimentation of the granular portion of the ore pulp and decantation of the thus dispersed colloidal constituents with the bulk of the water of the pulp, and as, at the same time, their adsorption or other bond for the coarser solid particles of the ore pulp is weakened, the removal of such colloidal constituents from the ore pulp is greatly facilitated over what is possible in their natural partially flocculated condition.

Even when the colloidal constituents of the ore pulp are originally deflocculated or have been deflocculated early in the treatment of the pulp, they may have become flocculated during the treatment to which the pulp is subjected or agents may have been added which cause them to flocculate, and in such cases the same general method of treatment is applied to secure deflocculation in accordance with the principles of this invention as would be applied to a pulp containing naturally flocculated colloidal constituents.

According to the present invention such ores or ore pulps are subjected to a preliminary treatment for the removal therefrom of colloidal constituents prior to the sulfidization and flotation operation. If the ore pulp contains the colloidal constituents in a dispersed or deflocculated state, the separation may be effected by a simple overflow or decantation which may be carried out in a tank of a type such as the Dorr, Allen or Callow tanks. If the ore pulp does not contain its colloidal constituents in a dispersed or deflocculated state, it is treated with an agent or agents which will serve to bring about the dispersion or deflocculation of the colloids and the decantation operation may then be similarly effected. The nature and amount of the agent or agents will vary with different ores, depending in part upon the so-called colloidal polarity, (whether electropositive or electronegative), of the constituents of the ore pulp and upon other like considerations. The nature and amount of the agent or agents required can be readily determined by means of a few tests based upon the general rules of colloid chemistry applicable to the dispersion or deflocculation of colloids.

Various substances, organic or inorganic, such as salts, acids and alkalis, or even substances which are themselves colloidal in nature may be used as the deflocculating or dispersing agent.

Among the substances which I have successfully used for the deflocculation and dispersion of the colloidal constituents of ore pulps for the purpose of putting such colloidal constituents in a sufficiently permanent state of suspension, so that when the treated pulp is subjected to differential settling or sedimentation in tanks of the ordinary types, the granular matter, including the valuable minerals, settles freely and rapidly, while the colloidal constituents remain in suspension in the water of the pulp, and can be separated from the granular sediment to any desired extent by simple decantation of the supernatant colloid-bearing water, I will mention the following examples.

Sodium silicate or water glass, which is an ordinary article of commerce, obtainable at a low price, is very satisfactory as a deflocculating agent and by proper manipulation can be used to suspend either positive or negative colloidal constituents. When it is to be used in an acid pulp, it is necessary, however, to first correct the acidity of the pulp, otherwise the sodium silicate is thrown into the gel state by the acid, and becomes ineffective, so also, the sodium silicate may be interfered with by the presence of excessive quantities of electrolytes, such as magnesium sulfate, but such excessive quantities of electrolytes can be removed by washing the ore prior to treatment with a deflocculating agent or they may be neutralized in the ore pulp by the addition of proper agents. For example, excessive quantities of magnesium sulfate in solution in the ore pulp, like excessive acidity can be corrected by the addition of an alkaline material like caustic soda, which forms with the magnesium sulfate a precipitate of magnesium hydrate. In the case of excessive acidity, the addition of an alkaline material like caustic soda, of course, corrects the acidity by the formation of sulfates. For the purpose just described, burned lime or calcium hydrate may be used, which has the advantage of cheapness, and if sulphuric acid is present the insoluble sulfate of lime is formed. I have used also acacia or gum arabic, which is a powerful deflocculating agent for certain colloidal slimes, but is usually too expensive for commercial use, although it is an extremely convenient agent to use in laboratory testing for this process. " Foundry molasses," has also been used commercially with success. This is a cheap form of molasses commonly used in foundries as an adhesive for core sand. Sodium tri-phosphate I have also used commercially, and in many cases deflocculation of an ore pulp can be obtained by the use of solutions of commercial sulphuric acid or caustic soda, or even caustic lime. The quantity of deflocculating and dispersing agent required in any particular case, as well as the agent best suited for that case, can be readily determined by simple laboratory tests on small quantities of pulp, but I have found that in practice it is a comparatively simple matter by employing tests commonly understood by chemists to determine the proper kind and quantity of deflocculating and dispersing agent in any given case. Ordinarily, the amount of deflocculating and dispersing agent will amount to only a few pounds per ton dry weight of ore. Thus using sodium silicate I have secured excellent results with quantities ranging from 5 lbs. down to ¼ lb. per ton of dry ore.

In some cases the flocculation of the colloidal constituents of the ore pulp is maintained by the electrolytes, such as magnesium sulfate naturally present in the ore pulp, and I have found, in such special cases, that simply washing the ore with clean water to effect the removal of the soluble electrolytes and repulping with fresh water is either sufficient in itself to deflocculate the colloidal constituents for the purpose of the present invention, or at least permits of securing that result with the use of much less deflocculating agent than would otherwise be necessary.

The distribution of the deflocculating agent through the concentrate pulp and its intimate mixture therewith may be brought about by agitating the deflocculating agent with the pulp by any commonly understood means as by adding the agent to the pulp previous to the passage of the latter through pumps, pipes or launders, by mechanical agitation or by the use of steam, air or water jets.

If the concentrate pulp is to be diluted with water it is generally desirable to dissolve or disperse the deflocculating agent in the dilution water before adding the latter to the pulp and then to agitate the diluted pulp to the required degree.

It may also be desirable in special cases to heat or cool the concentrate pulp above or below its natural temperature to hasten or facilitate the deflocculation of the colloidal constituents.

Heating the pulp may be accomplished by commonly understood means such as the use of steam jets or steam coils, or dilution with hot water where direct heating is not practicable and cooling may be accomplished by passing the pulp over cooling towers with evaporating trays, or by dilution with cold water.

After the deflocculation or dispersion of the colloids or colloidal slimes has been effected, separation of the whole or a part of the dispersed colloids is effected by differential settling and decantation of the bulk of the water and suspended colloidal constituents, so that there remains a more concentrated ore pulp of decreased colloid content. The decantation may be carried out by commonly understood methods and with tanks, such as the Dorr, Allen or Callow tanks, and, if desired on the counter-current principle, with progressive removal of the colloidal constituents, accompanied by the addition of water and further dilution or washing out of the colloidal constituents, so that their removal may be carried to the desired extent.

The removal, by sedimentation and decantation, from the mineral ore pulp of the colloidal constituents depends for its effectiveness upon the relative difference in the rate of settling or sedimentation of the ore particles and the colloidal constituents. For this reason it is desirable to cause the colloidal constituents to settle at a much slower rate than the mineral and gangue particles in the ore pulp, whereby, after a predetermined settling of the mineral and gangue particles, any desired portion of the supernatant liquor containing the slower-settling colloidal constituents can be decanted in any suitable way to effect the removal from the mineral ore pulp of the desired quantity of the colloidal constituents. In this connection, the present invention contemplates the dispersion or deflocculation of the colloidal constituents so as to cause them to settle at a very much slower rate than would be the case if they were coagulated or flocculated, so that they will remain in more or less permanent suspension in quiet pulp, thus permitting settling or sedimentation of the sands and slimes containing the valuable minerals, and decantation by displacement, or otherwise, of the water containing the suspended colloids or colloidal slimes.

With the removal of the colloidal slimes there will, of course, also be removed a corresponding portion of the water of the ore pulp, together with such constituents as are dissolved therein.

The colloidal slimes which are separated from the ore pulp are commonly of a character such that they can be run to waste. In case, however, these slimes carry sufficient values, they may be themselves subjected to a further treatment for the recovery of the values therefrom.

The water accompanying the removed colloids may be separated and recovered for reuse. The colloidal slimes contained therein may thus be coagulated, and settled or filtered out. The water separated from the colloids may be purified, if necessary, to free it from dissolved salts prejudicial to the flotation, or prejudicial to the maintenance of the desired state of dispersion of the ore pulp to which it may be subsequently added.

The more concentrated ore pulp thus obtained is now subjected to a suitable sulfidizing treatment, for example, by the addition of hydrogen sulfid or of a soluble sulfid or sulph-hydrate or sulphonated oil or colloidal sulphur, accompanied by proper agitation. Owing to the more concentrated condition of the ore pulp and its freedom or relative freedom from objectionable amounts of colloidal constituents, the sulfidizing agent can be more readily brought into intimate contact with the ore particles and the sulfidizing thereof, to the desired extent, more readily brought about.

After the sulfidizing operation the ore pulp may be given a further treatment to remove any objectionable amounts of sulfidizing agent which may remain in the pulp and is then subjected to a flotation treatment which may be carried out in the usual types of flotation apparatus, for example, the Callow cell, and with the addition of a suitable oil or other flotation agent. Further dilution of the ore pulp by the addition of water will usually be necessary for flotation thereof.

The removal of the colloidal constituents is of advantage both in the sulfidizing treatment and in the subsequent flotation treatment. In the flotation process the absence of objectionable amounts of colloidal constituents enables a cleaner concentrate to be obtained and makes it possible to operate with a more concentrated pulp and with corresponding increase in tonnage of ore treated by a plant of given size.

I have found that an extremely convenient and effective way of securing the necessary distribution of the dispersing or deflocculating agent through the mass of the ore pulp, and of securing the desired degree of dispersion or deflocculation of the colloids or colloidal slimes present in said ore pulp, consists in adding the deflocculating or dispersing agent to the pulp at some point prior to the admission of the ore pulp to the ball or pebble mills, or other fine grinding machines. Such machines almost invariably form a part of the equipment of ore dressing plants, as a preliminary step in the process of preparing ores for treatment by flotation.

By so adding the deflocculating or dispersing agent to the ore pulp ahead of the fine grinding mills, the necessary mixture is secured without inconvenience or added expense, and the dispersion or deflocculation of the colloids or colloidal slimes takes place under the most favorable conditions of violent agitation. Under these conditions floccules or coagules are readily broken up and prevented from reforming, or particles already coated with colloids or enmeshed within floccules, are cleaned or released; such colloids as are released from a solid or indurated condition by the grinding, are immediately placed in the dispersed or deflocculated state, and the fresh mineral surfaces exposed by the grinding are prevented from being coated with inhibitory coatings of colloidal material.

The process of the present invention may be combined with other than flotation operations. For example, the ore pulp may be subjected to a preliminary separation by jigs, or subjected to other preliminary methods of treatment prior to the flotation operation. In such cases, the colloidal slimes may be removed either just prior to the flotation operation or at some previous period of treatment of the ore pulp; and the addition of the dispersing agent, where such addition is necessary or desirable, may similarly take place at any suitable point or points prior to the removal of the colloids, so that the colloids will be in a dispersed state at the time of their removal.

Where the mineral pulp or the concentrate contains in solution in the water thereof constituents which prevent dispersion or deflocculation, such constituents may be in part or in whole removed, as by the removal of the water from the ore pulp prior to the dispersion or deflocculation treatment, or they may be otherwise neutralized and rendered harmless by methods and agents which are generally known, and can be regulated by simple tests. For example, an excessive quantity of magnesium sulphate or other electrolyte in the pulp interferes with the proper action of sodium silicate as a dispersing agent. Such a condition may be corrected by washing the ore for the removal of soluble salts. Where the pulp is acid or where there is latent acidity due to the occlusion of sulphur dioxide, an alkali may be added to correct the acidity, whereby the sodium silicate is enabled to act in the desired manner.

Where the ore contains a mixture of mineral constituents or species, such as lead and zinc sulfids, in addition to lead carbonate and zinc carbonate, etc., the removal of the colloidal constituents before sulfidization and flotation may be brought about to such an extent only that flotation of the lead sulfid will be permitted and flotation of the zinc sulfid inhibited by the remaining colloids. In such differential flotation advantage may also be taken of the well known selective qualities of certain oils for the various minerals. Thereafter the ore pulp may be treated for the further removal of colloidal constituents in the manner above referred to, followed, if required, by further sulfidization treatment, so that flotation of the zinc will be permitted and a zinc concentrate may then be obtaiend by subjecting the ore to a further flotation treatment.

In the treatment of oxidized copper ores containing other oxidized metals, the ore pulp may be treated in the manner above referred to for the removal of a part or the whole of the colloidal constituents and the ore pulp may then be subjected to the sulfidizing treatment. If a part only of the colloidal constitutents have been removed so that for example, flotation of the sulfidized copper will be permitted while sufficient of the colloidal constituents is retained to inhibit flotation of other sulfids such as iron sulfid, a differential flotation of the cooper sulfid may be brought about with the aid of a flotation agent promoting such differential separation. Thereafter, the ore pulp may be subjected to a further flotation treatment for the recovery of iron sulfid with the aid of an appropriate flotation agent for promoting such recovery and this operation can be further improved by the preliminary removal of further amounts of the colloidal constituents prior to the flotation.

In general, such a differential concentration by flotation of the mineral particles involves a removal of colloidal constituents from the mineral pulp before each sulfidizing treatment and flotation operation. That is to say, the invention, in this aspect, involves a sequence of operations in which a part of the colloidal constituents are removed, the pulp then sulfidized and floated, another portion of the colloids removed and the pulp again sulfidized and floated, with a repetition of these operations to effect the desired differential concentration by flotation of the mineral constituents or species present in the ore pulp. Such a procedure results in a more perfect sulfidization of the remaining minerals after each colloid removal. Where the original mineral pulp contains, in addition to oxidized minerals, mineral constituents naturally amenable to the flotation process, such, for example, as natural sulfids, these naturally flotatable constituents may be first removed by a flotation operation, with or without a preliminary removal of the colloidal constituents.

The sulfidizing treatment and flotation operation, following the colloid removal, may be effected in any suitable manner. While I have hereinbefore particularly described a procedure involving a sulfidizing treatment followed by a subsequent flotation operation, it will, of course, be understood that I do not intend to limit myself to such a procedure. Thus, for example, the colloid removal may be followed by a flotation operation in the presence of a sulfidizing agent, either in one or several steps.

Throughout this specification and the appended claims, I intend to embrace in the expressions "colloids" and "colloidal constituents" both true colloids and those quasi or borderland substances, which may not be truly colloidal but partake of the qualities of, or resemble, colloids, and without regard to the sources from which such colloidal matters are derived. Thus, for the purposes of the present invention, the colloidal constituents may be considered as ranging from just above the molecular size upward through the class of so-called suspensoids, which, while possibly not true colloids, still, because of their relatively large specific surface, exhibit some, if not all, of the properties of colloids, and are capable of existing in both the sol or gel state, or of being dispersed and coagulated, or flocculated and deflocculated, and exhibit flotation inhibitory effects to an extent sufficient to render them amenable to the treatments desired herein.

The colloidal constituents of ore pulps may be sulfidization-inhibitory (and) or flotation-inhibitory, but regardless of the deleterious action which they may exercise in the sulfidization (and) or flotation of the valuable mineral particles of the ore pulp, it is the purpose of the present invention to provide means for the control of such inhibitory actions.

While I have hereinbefore particularly described the removal of the colloidal constituents to the desired extent by sedimentation and decantation, the removal of colloids may be effected by a preliminary flotation operation in which a froth or scum containing part or the whole of the colloidal constituents with a relatively small proportion of the valuable minerals contained in the pulp, is separated from the bulk of the mineral or pulp. After the removal of the colloidal constituents by such a preliminary flotation treatment, the remaining ore pulp is subjected to appropriate sulfidization and flotation treatments as previously described.

This removal of colloidal matter from an ore pulp by a preliminary flotation treatment is more particularly described and claimed in my copending patent application Serial No. 283,629, filed March 19, 1919, and the removal of colloidal and dispersed matter by sedimentation and decantation is fully described and claimed in my copending patent application Ser. No. 283,628, filed March 19, 1919.

I claim:

1. The process of concentrating ores containing oxidized metalliferous minerals and also containing colloidal constituents in amount sufficient to inhibit effective sulfidizing of the oxidized metalliferous minerals and flotation thereof, which comprises removing from such ore a portion of said colloidal constituents sufficient to permit proper sulfidizing for flotation of the oxidized metalliferous minerals, then sulfidizing said oxidized metalliferous minerals to the extent desired, and thereafter floating the sulfidized contents of the ore.

2. The method of concentrating oxidized minerals associated in a mineral pulp with colloidal constituents, which comprises adding to the mineral pulp an agent promoting the dispersion of the colloidal constituents, removing the dispersed constituents to the desired extent from the pulp, subjecting the remaining pulp to a sulfidizing treatment, and subjecting the sulfidized pulp to a flotation operation.

3. The process of concentrating ores containing oxidized metalliferous minerals and also containing colloidal constituents in amount sufficient to inhibit effective sulfidizing of the oxidized metalliferous minerals and flotation thereof, which comprises removing from such ore a portion of said colloidal constituents in a dispersed condition and in sufficient amount to permit proper sulfidizing for flotation of the oxidized metalliferous minerals, then sulfidizing said oxidized metalliferous minerals to the extent desired, and thereafter floating the sulfidized contents of the ore.

4. The method of effecting the differential flotation of oxidized minerals associated in a mineral pulp with colloidal constituents, which comprises separating a part of the colloidal constituents from the mineral pulp, subjecting the thus-treated pulp to a sulfidizing treatment, then subjecting the pulp to a flotation operation with an appropriate flotation agent for the recovery of certain of the mineral species, then removing a further portion of the colloidal constituents from the remaining pulp, and subjecting the pulp to a further flotation operation.

5. The method of effecting the differential flotation of oxidized minerals associated in a mineral pulp with colloidal constituents, which comprises separating a part of the colloidal constituents from the mineral pulp, subjecting the pulp to a sulfidizing treatment, subjecting the sulfidized pulp to a flotation operation under conditions permitting flotation of certain mineral species thereof while substantially inhibiting the flotation of others, and repeating the above sequence of operations to effect the desired differential concentration by flotation of the mineral species remaining in the pulp.

6. The method of effecting the differential flotation of oxidized minerals associated in a mineral pulp with colloidal constituents, which comprises dispersing the collodial constituents in the mineral pulp and removing a part of the colloidal constituents from the mineral pulp, subjecting the pulp to a sulfidizing treatment and to a flotation operation for the selective separation by flotation of certain mineral species thereof removing a further part of the colloidal constituents from the remaining mineral pulp and subjecting the remaining pulp to a further sulfidizing treatment and to a flotation operation for the separation by flotation of other mineral species thereof.

7. The method of effecting the differential flotation of minerals associated in a mineral pulp with colloidal constituents, which comprises subjecting the mineral pulp to a flotation operation for the separation therefrom of naturally flotatable mineral species, dispersing the colloidal constituents in the remaining pulp and removing the dispersed colloidal constituents to the desired extent from the pulp, subjecting the pulp to a sulfidizing treatment, and subjecting the sulfidized pulp to a flotation operation.

8. The method of improving the flotation of oxidized minerals associated in a mineral pulp with colloidal constituents, which comprises subjecting the mineral pulp to a flotation operation for the separation therefrom a naturally flotatable mineral constituents, removing the colloidal constituents to the desired extent from the remaining mineral pulp, and thereafter subjecting the pulp to a sulfidizing treatment and a flotation operation.

9. The method of improving the flotation of oxidized minerals associated in a mineral pulp with colloidal constituents, which comprises dispersing or deflocculating the colloidal constituents, removing the dispersed constituents to the desired extent from the mineral pulp, and thereafter subjecting the pulp to a sulfidizing treatment and a flotation operation.

In testimony whereof I affix my signature.

WALTER O. BORCHERDT.

Certificate of Correction.

It is hereby certified that in Letters Patent No. 1,446,375, granted February 20, 1923, upon the application of Walter O. Borcherdt, of Austinville, Virginia, for an improvement in "Concentration of Oxidized Ores," errors appear in the printed specification requiring correction as follows: Page 4, lines 65 and 66, for the misspelled word "obtaiend" read *obtained;* same page, line 81, for the word "cooper" read *copper;* page 5, line 20, for the word "desired" read *described;* same page, line 51, for the words "collodial" and "dispersed" read *dispersed colloidal;* page 6, line 27, claim 8, for the article "a" read *of;* and that the said Letters Patent should be read with these corrections therein that the same may conform to the record of the case in the Patent Office.

Signed and sealed this 17th day of April, A. D., 1923.

[SEAL.]

KARL FENNING,
*Acting Commissioner of Patents.*